United States Patent [19]

Kodama

[11] 3,896,341

[45] July 22, 1975

[54] PROTECTING DEVICE FOR A SEMICONDUCTOR MEMORY APPARATUS

[75] Inventor: Koji Kodama, Tokyo, Japan

[73] Assignee: Tokyo Shibaura Electric Company, Ltd., Japan

[22] Filed: Apr. 20, 1973

[21] Appl. No.: 353,130

[30] Foreign Application Priority Data

Apr. 22, 1972 Japan .............................. 47-40749

[52] U.S. Cl. .......... 317/33 R; 317/36 TD; 307/234; 328/111

[51] Int. Cl. .............................................. H02h 7/20

[58] Field of Search .......... 317/33 R, 361 D, 33 SC; 307/233, 234, 202, 225, 226; 328/120, 110, 111, 133, 112; 329/106; 323/119

[56] References Cited

UNITED STATES PATENTS

| | | | |
|---|---|---|---|
| 2,984,789 | 5/1961 | O'Brien | 307/234 |
| 3,036,272 | 5/1962 | Le Vezu | 328/112 |
| 3,184,606 | 5/1965 | Ovenden et al. | 307/234 |
| 3,293,606 | 12/1966 | Ackerman et al. | 307/234 |
| 3,458,822 | 7/1969 | Hahn, Jr. | 328/120 |
| 3,652,943 | 3/1972 | Piccirilli et al. | 307/234 |

OTHER PUBLICATIONS

Pulse, Digital, and Switching Waveforms, Millman & Taub, McGraw-Hill Book Co., p. 333, Fig. 9-27.

*Primary Examiner*—J. D. Miller
*Assistant Examiner*—Patrick R. Salce
*Attorney, Agent, or Firm*—Oblon, Fisher, Spivak, McClelland & Maier

[57] ABSTRACT

A protecting device for a semiconductor memory which protects the plural semiconductor memory elements from damage due to an abnormal pulse being received from the driving circuits. The output signals from the precharge and chip select signal drivers in a MOS-RAM are sampled and time-delayed. The sampled signals are compared with the time delayed signals in gating circuits. If the sampled signals exceed a predetermined pulse width, sensing means are actuated to activate the alarm and terminate the source voltage to prevent damage to the memory elements.

3 Claims, 6 Drawing Figures

PROTECTING DEVICE FOR A SEMICONDUCTOR MEMORY APPARATUS

BACKGROUND OF THE INVENTION

1. Field of the Invention:

This invention relates to semiconductor memory apparatus, and more particularly to data storage apparatus for an electronic digital computer which includes means for protecting the memory elements against abnormal pulse signals occurring in the driving circuitry.

2. Description of the Prior Art:

An MOS (metal oxide semiconductor) random access memory(hereinafter called RAM)finds wide use as a data storage device in an electronic digital computer. Generally, MOS-RAMs are classified into two types: static and dynamic. As seen in FIG. 1(*a*), the memory elements of a static type of MOS-RAM are flip-flop circuits that comprise a feedback circuit using MOS transistors. In this device, storage information will not be destroyed during the period that the source voltages $V_{DD}$ are supplied to the memory elements. A dynamic type of device is shown in FIG. 1(*b*) as comprising MOS transistors with information being stored in a capacitor C. Stored information is maintained by refreshing the charge on the capacitor, as is well-known in the art.

In FIG. 2, a representative dynamic type of MOS-RAM is shown, the capacity of which is 1024 words × 1 bit. In the one chip shown, four memory portions 11, 12, 13 and 14 are arranged symmetrically in two portions. Each memory portion comprises 256 bits (16 columns × 16 rows). The column decoders 15*a* and 15*b* and the row decoders 16*a* and 16*b* are provided for memory portions 11, 12, 13 and 14, and said columns and rows are selected by five bit addresses. A pair of refresh amplifiers 17 and 18 are provided, one for memory portions 11 and 12 and one for memory portions 13 and 14 in the row direction as shown. One column in the memory portions 11, 12, 13 and 14 is selected by a five bit address by the column decoders 15*a* and 15*b*, and then the information is read from all of the thirty-two memory elements existing in said column. The refresh amplifier 17 or 18 will then amplify the information in said thirty-two memory elements. Thus, the information will be rewritten in the memory elements of the selected column, and will then be simultaneously transmitted to the row decoders 16*a* and 16*b*. These row decoders 16 *a* and 16*b* select the information from one of the thirty-two elements by a five bit address for transmission as the desired output. Since the thirty-two memory elements of one column are refreshed in one read cycle, thirty-two read cycles are necessary to refresh the 1024 memory elements of all addresses.

FIG. 3 shows various waveforms illustrative of signals utilized in the MOS-RAM of FIG. 2. Waveform(a)of FIG. 3 represents the address setting period; waveform (b) represents the precharge signal (PRE); waveform (c) represents the chip select signal (CS) accumulated by said precharge signal (PRE); waveform (d) represents the read write signal (R/W) and waveforms (e) and (f) represent the input signal and output signal, respectively. Thus, it is seen that the most electric power is utilized during the time required to supply the PRE signal to each RAM device. Accordingly, if an abnormally large PRE signal occurred, it could cause serious damage to the semiconductor memory elements which receive PRE signals from driving circuits. Steps should be taken to avoid such damage by detecting such abnormal signals prior to their entry to the memory elements and by, for example, actuating an alarm and cutting off the source voltage when an abnormal signal is detected.

SUMMARY OF THE INVENTION

It is therefore a primary object of the present invention to provide a new improved and unique semiconductor memory apparatus which includes means for protecting the memory elements against damage by abnormal driving circuitry signals, thus greatly increasing the reliability of an electronic digital computer.

The foregoing and other objects are attained in accordance with one aspect of the present invention through the provision of a pair of detecting circuits for sampling the outputs of the precharge and chip select signal drivers. The output from each detecting circuit is fed to a pair of serially-connected wave adjusting circuits which act on the sampled signal to compare it to a time-delayed version thereof. If the output pulse signal of either the precharge or chip select drivers exceed a predetermined pulse width, a gate is activated to actuate an alarm and to cut-off the supply voltage to prevent the abnormal signal from damaging the memory elements.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DESCRIPTION OF THE PREFERRED EMBODIMENTS

Figure 4:
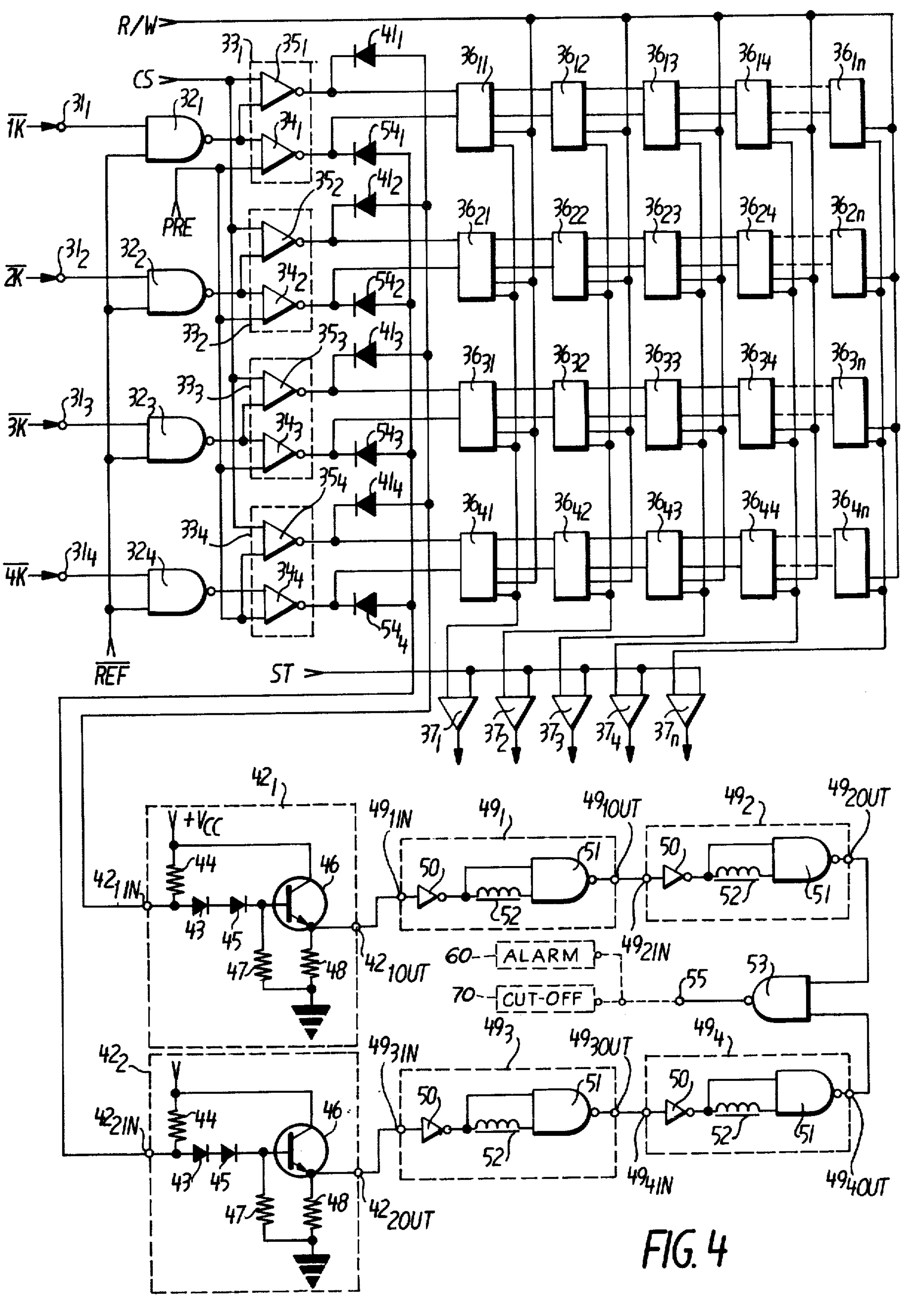
FIG. 4 is a schematic diagram illustrating a preferred embodiment of the present invention.

Referring now to the drawings, wherein like reference numerals designate identical or corresponding parts throughout the several views, and more particularly to FIG. 4 thereof a preferred embodiment of this invention is shown as comprising a dynamic type MOS-RAM comprising a memory of 4K (4096) words × *n* bits. Numerals $31_1$, $31_2$, $31_3$ and $31_4$ represent the address signal input terminals that are supplied with the decoded address signals $\overline{1K}$, $\overline{2K}$, $\overline{3K}$ and $\overline{4K}$, respectively, for chip selecting. These address signal input terminals $31_1$, $31_2$, $31_3$ and $31_4$ are connected to one input terminal of the NAND gates $31_1$ $32_2$, $32_3$ and $32_4$, respectively. The other input terminal of said NAND gates are connected in common, and are supplied with the refresh signal $\overline{REF}$. The output terminals of NAND gates $32_1$, $32_2$, $32_3$ and $32_4$ are connected to a first input terminal of PRE drivers $34_1$, $34_2$, $34_3$ and $34_4$, respectively, in MOS driving circuits $33_1$ $33_2$ $33_3$ and $33_4$, respectively. The second input terminal of said PRE drivers are connected in common and are supplied with precharge signal PRE. The first input terminal of said PRE drivers $34_1$, $34_2$, $34_3$ and $34_4$ are additionally each connected to an input terminal of CS drivers $35_1$, $35_2$, $35_3$ and $35_4$, respectively. The other input terminals of CS drivers $35_1$, $35_2$, $35_3$ and $35_4$ are connected in common, and are supplied with the chip select signal CS. The output terminals of each MOs driving circuit, consisting of the outputs of a PRE driver and a CS driver, are connected to a MOS-RAM. For example, the output terminals of MOS driving circuit $31_1$, consisting of the outputs of PRE driver $34_1$ and CS driver $35_1$, are connected to MOS-RAM $36_{11}$.

MOS-RAM devices $36_{11}$ . . . $36_{1n}$, $36_{21}$ . . . $36_{2n}$, etc, are supplied with a read/write (R/W) signal and are connected to an input terminal of sense amplifiers $37_1$, $37_2$ . . . $37_n$. The other input terminals of the sense amplifiers are connected in common, and are supplied with a sense strobe signal ST. Said driving circuits $33_1$, $33_2$, $32_3$ and $33_4$ are also connected to the protecting device of the present invention.

The protecting device of the present invention generally comprises a pair of detecting signal invert circuits $42_1$ and $42_2$, and wave adjusting circuits $49_1$, $49_2$, $49_3$ and $49_4$, the operation of which will become more clear hereinafter. Diodes $41_1$, $41_2$, $41_3$ and $41_4$ are connected to the output terminals of CS drivers $35_1$, $35_2$, $35_3$ and $35_4$, respectively. The anode electrodes of said diodes are connected in common to the input terminal $42_{1IN}$ of the detecting signal invert circuit $42_1$ which is connected to the anode electrode of the diode 43, and is supplied with a driving source voltage +Vcc through the resistor 44. The cathode electrode of diode 43 is connected to the base electrode of NPN transistor 46 through the diode 45, and is connected to ground through the resistor 47. The emitter electrode of transistor 46 is connected to ground through the resistor 48, and is also connected to the output terminal $42_{1OUT}$. The collector electrode of transistor 46 is connected to the driving source voltage +Vcc. A low voltage signal is delivered at output terminal $42_{1OUT}$ of detecting signal invert circuit $42_1$ if a negative signal is delivered from each output terminal of the CS drivers $35_1$, $35_2$, $35_3$ and $35_4$. Output terminal $42_{1OUT}$ is connected to the input terminal $49_{1IN}$ of the wave adjusting circuit $49_1$ which serves to shorten the pulse width of the low voltage signal. The input terminal $49_{1IN}$ of wave adjusting circuit $49_1$ is connected to the input terminal of the inverter 50. This inverter's output terminal is connected to one input terminal of a NAND gate 51 and is connected to the other input terminal through the delay circuit 52. The output terminal $49_{1OUT}$ is connected to the input terminal $49_{2IN}$ of another wave adjusting circuit $49_2$. The output terminal $49_{2OUT}$ of wave adjusting circuit $49_2$ is connected to one input terminal of a NAND gate 53.

The output terminals of PRE drivers $34_1$, $34_2$, $34_3$ and $34_4$ are connected to a cathode electrode of diodes $54_1$, $54_2$, $54_3$, and $54_4$, respectively. The anode electrodes of said diodes are connected in common to the input terminal $42_{2IN}$ of the other detecting signal invert circuit $42_2$. The output terminal $42_{2OUT}$ of detecting signal invert circuit $42_2$ is connected to the input terminal $49_{3IN}$ of the wave adjusting circuit $49_3$, and the output terminal $49_{3OUT}$ is connected to the input terminal $49_{4IN}$ of the wave adjusting circuit $49_4$. The output terminal $49_{4OUT}$ of wave adjusting circuit $49_4$ is connected to the other input terminal of NAND gate 53. The output terminal of NAND gate 53 is connected to the abnormal signal output terminal 55. This output terminal 55 is connected to an alarm means 60 and/or a source voltage cut-off means 70, which are actuated in a manner to be described hereinafter.

Figure 1A:
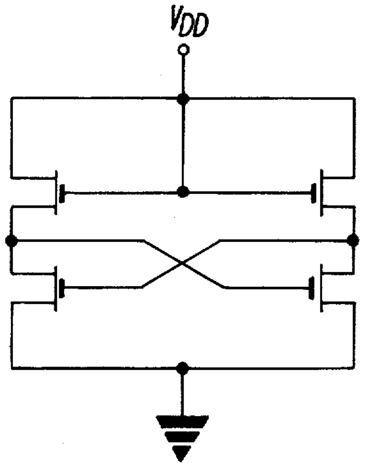
FIG. 1 illustrates well-known examples of prior art semiconductor memory elements.
Figure 1B:
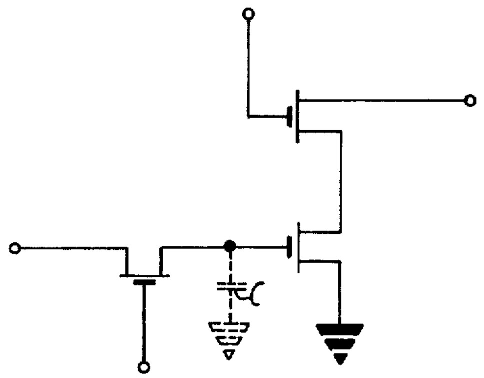
Figure 2:
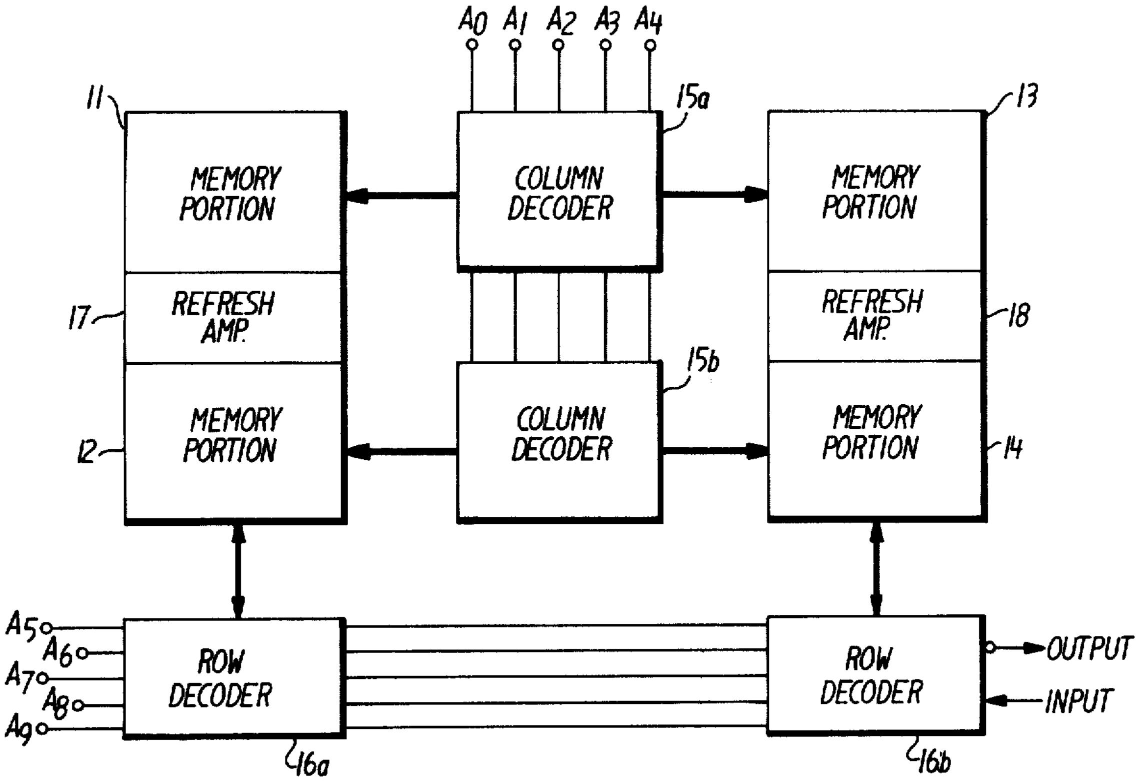
FIG. 2 is a block diagram illustrating a semiconductor memory apparatus.
Figures 3A, 3B, 3C, 3D, 3E, 3F:
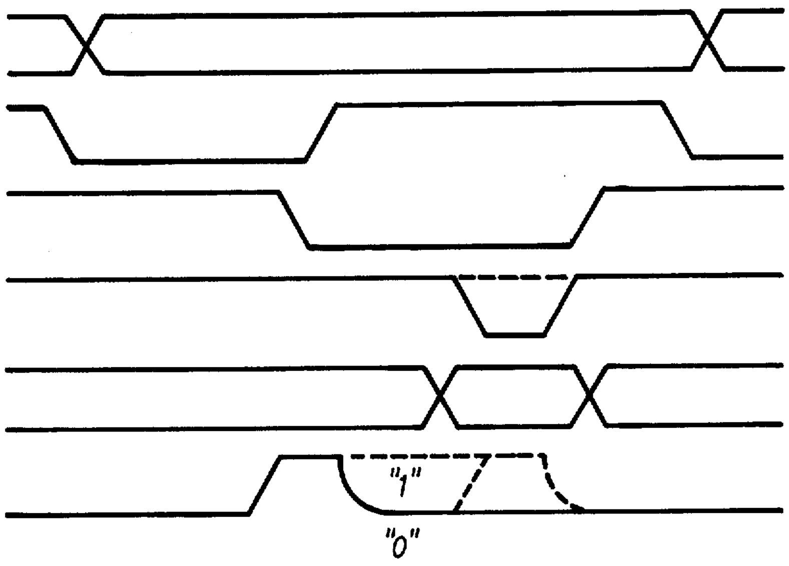
FIG. 3 shows the characteristic curves of the operation of the apparatus of FIG. 2.
Figures 5A, 5B, 5C, 5D, 5E, 5F, 5G:
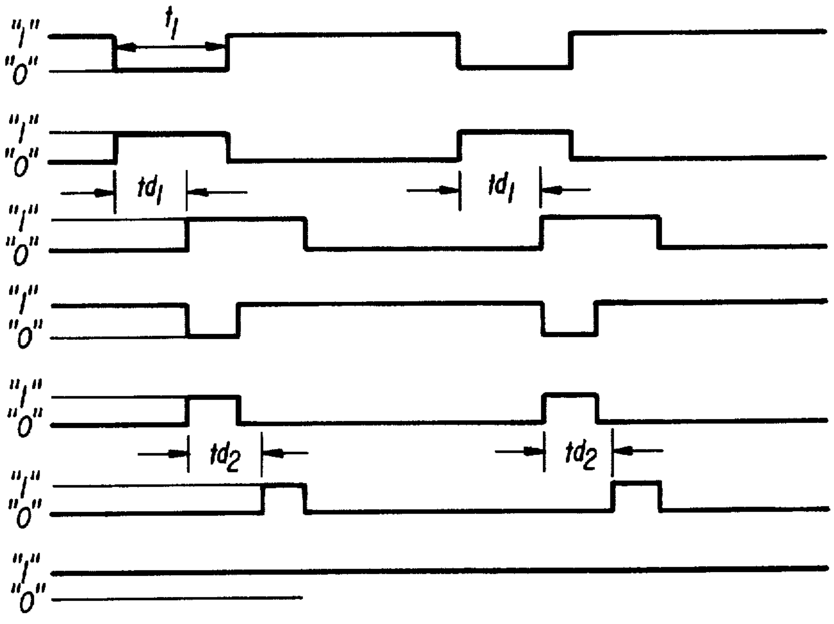
FIGS. 5 and 6 are timing diagrams helpful in understanding the operation of the device of FIG. 4.
Figures 6A, 6B, 6C, 6D, 6E, 6F, 6G, 6H:
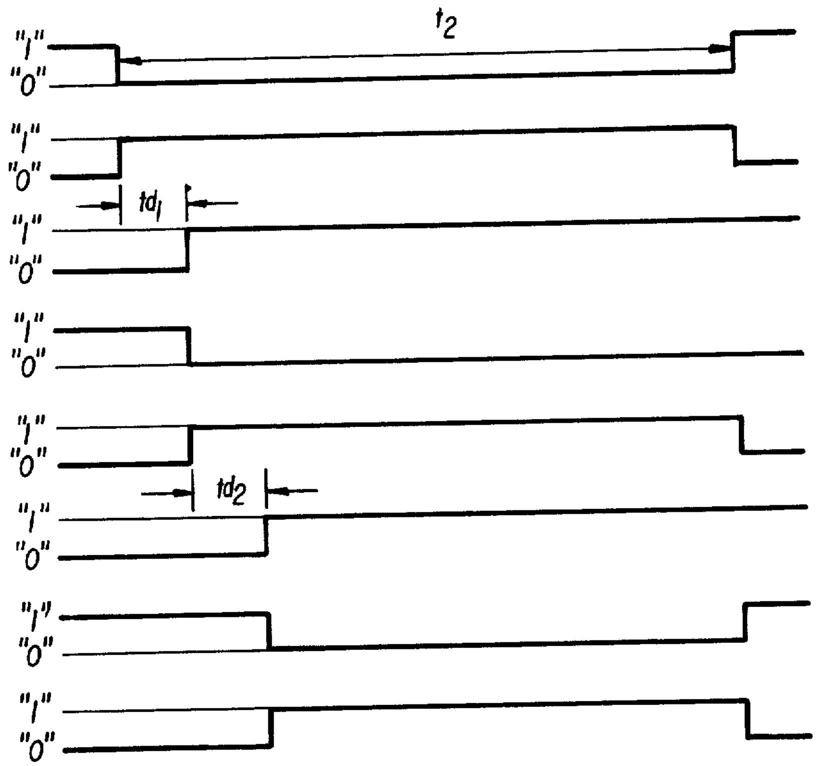

The operation of this embodiment will be more fully understood with the aid of FIG. 5 and FIG. 6. Decoded address signal TTL 0 level is supplied to the address signal input terminal $31_1$, and a negative $\overline{REF}$ signal is supplied to NAND gate $32_1$. Therefore, the signal 1 is yielded at the output terminal of NAND gate $32_1$. This signal is supplied to the MOS driving circuit $33_1$. If positive logic with the CS signal and the PRE signal is approved, an MOS level signal is transmitted to one column of MOS-RAM devices $36_{11}$, $36_{12}$ . . . $36_{1n}$. The output signal from each device $36_{11}$, $36_{12}$ . . . $36_{1n}$ are transmitted to sense amplifiers $37_1$, $37_2$ . . . $37_n$. These signals and the ST signal are logically summed, and the amplified signals are yielded from the output terminals of the sense amplifiers.

If a normal negative pulse having a proper time duration $_1$ is delivered from CS driver $35_2$ of the driving circuit $33_2$, it is transmitted to the input terminal $42_{1IN}$ of the detecting signal invert circuit $42_1$ through the diode $41_2$. In detecting signal invert circuit $42_1$ a driving voltage +Vcc is supplied to the base electrode of transistor 46 through resistor 44 and diodes 43 and 45 during the condition when no pulse is supplied to input terminal $42_{1IN}$. Thus, at the output terminal $42_{1OUT}$ a low level voltage 0 signal is yielded (shown in FIG. 5(*a*)). This 0 signal is supplied to the input terminal $49_{1IN}$ of wave adjusting circuit $49_1$, and becomes a 1 signal after being reversed through the inverter 50 as shown in FIG. 5(*b*). This 1 signal is supplied to one input terminal of NAND gate 51. A similar pulse, delayed by time $td_1$, is delivered to the other input terminal through delay circuit 52 as seen in FIG. 5(*c*). Thus, a reversed and shortened pulse is yielded at output terminal $49_{1OUT}$ of NAND gate 51 as shown in FIG. 5(*d*). This delayed pulse is subsequently supplied to the input terminal of wave adjusting circuit $49_2$, and a reversed signal is yielded from the output terminal of the inverter 50, as shown in FIG. 5(*e*). This signal is supplied to one input terminal of NAND gate 51, and is also supplied to delay circuit 52. Thus, a time $td_2$ delayed pulse is supplied to the other input terminal of NAND gate 51, as shown in FIG. 5(*f*). Therefore, the output signal at the output terminal of NAND gate 51 is not varied, as shown in FIG. 5(*g*), and maintains the 1 level. This signal is supplied to one input terminal of NAND gate 53. Similarly, the output signal from PRE driver $34_2$ of the driving circuit $33_2$ will be supplied to the other input terminal of NAND gate 53. Thus, a 0 signal appears at the abnormal signal output terminal 55 during normal operating conditions, and alarm means 60 and source voltage cut-off means 70 connected to output terminal 55 will not be activated.

If, however, an abnormal negative pulse having an undesirably long time duration $t_2$ is delivered from CS driver $35_2$ of driving circuit $33_2$, it will be supplied to input terminal $42_{1IN}$ of the detecting signal invert circuit $42_1$ through the diode $41_2$. The transistor 46 cuts off, and a low level 0 signal having a time width $t_2$ will be delivered from output terminal $42_{1OUT}$, as shown in FIG. 6(*a*). This 0 level signal is supplied to the input terminal $49_{1IN}$ of wave adjusting circuit $49_1$, and becomes reversed to a 1 level signal through inverter 50, as shown in FIG. 6(*b*). This signal is supplied to one input terminal of NAND gate 51. A time $td_1$ delayed pulse is delivered to the other input terminal of NAND gate 51 through delay circuit 52 as shown in FIG. 6(*c*). Therefore, the reversed pulse is yielded at the output terminal $49_{1OUT}$ of NAND gate 51, as shown in FIG. 6(*d*). This shortened pulse is supplied to the input terminal of the wave adjusting circuit $49_2$, and subsequently a reversed pulse is delivered at the output terminal of the inverter 50, as shown in FIG. 6 (*e*). This signal is supplied to one input terminal of NAND gate 51, and is also supplied to the delay circuit 52, the delayed pulse therefrom, as seen in FIG. 6(*f*), being supplied to the other input terminal of NAND gate 51. Thus, a reversed "0" level pulse is delivered at the output terminal of NAND gate 51, as shown in FIG. 6(*g*). This signal is supplied to one input terminal of NAND gate 53. Therefore, a reversed 1 level signal is yielded from the output terminal of NAND gate 53, as shown in FIG. 6(*h*). This 1 level signal is delivered at the abnormal signal output terminal 55, and an alarm device 60 or source voltage cut-off device 70, each connected to said terminal 55, are thereby actuated.

By virtue of the aforedescribed embodiment of the present invention, trouble in the driving circuits can be effectively detected in a simple manner to protect the memory elements from serious damage.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Apparatus for protecting the semi-conductor memory elements in a semiconductor device from damage due to abnormal pulses from the driving circuitry thereof, which comprises:

means for sampling a pulse signal from said driving circuitry;

means for time-delaying said pulse signal;

means for comparing said pulse signal with said time-delayed pulse signal and for issuing an output signal indicative of whether said pulse signal exceeds a pre-determined pulse width;

said time-delaying and comparing means comprising a first inverter having an input and an output for receiving as its input the pulse signal from said driving circuitry;

a second inverter having an input and an output;

a first delay circuit having an input and an output;

a second delay circuit having an input and an output;

a first NAND gate having two inputs and an output;

a second NAND gate having two inputs and an output;

means connecting the output of the first inverter to the input of the first delay circuit and to an input of the first NAND gate;

means connecting the output of the first delay circuit to the other input of the first NAND gate;

means connecting the output of the first NAND gate to the input of the second inverter;

means connecting the output of the second inverter to the input of the second delay circuit and to an input of the second NAND gate;

means connecting the output of the second delay circuit to the other input of the second NAND gate;

the output of the second NAND gate being indicative of whether said pulse signal exceeds a predetermined pulse width.

2. Apparatus for protecting the semiconductor memory elements in a semiconductor memory device from damage due to abnormal pulses from a precharge signal driver and/or a chip select signal driver, which comprises:

first and second diode means for sampling a pulse signal from said precharge signal driver and said chip select signal driver, respectively;

first and second means connected to receive the output signals from said first and second sampling means, respectively, for establishing respective voltage signals indicative of the presence or absence of said output signals;

first and second wave-adjusting means connected to receive said voltage signals from said first and second establishing means, respectively, said first and second wave-adjusting means including means for time-delaying said voltage signals, gating means for comparing said voltage signals with said time delayed voltage signals and for issuing first and second difference signals indicative of whether said voltage signals exceed a predetermined pulse width, means for time-delaying said first and second difference signals, gating means for comparing said first and second difference signals with said time-delayed first and second difference signals and for issuing third and fourth difference signals indicative of whether said first and second difference signals exceed a predetermined pulse width; and sensing means for receiving as its inputs the outputs of said first and second wave-adjusting means and for issuing an output signal responsive to said inputs.

3. The apparatus according to claim 2 wherein said sensing means comprises a NAND gate, the output of which is connected to alarm means and source voltage cut-off means.

* * * * *